US006917977B2

(12) United States Patent
White et al.

(10) Patent No.: US 6,917,977 B2
(45) Date of Patent: Jul. 12, 2005

(54) METHOD AND SYSTEM OF AUTOMATIC ALLOCATION OF UNIQUE SUBNET IDENTIFIER TO A SUBNET IN THE NETWORK HAVING MULTIPLE SUBNETS AND A PLURALITY OF ASSOCIATED ROUTERS AND ROUTER INTERFACES

(75) Inventors: Andrew Edward White, Matraville (AU); Kwan-Wu Chin, Dluwich Hill (AU); John Thomas Judge, Coogee (AU); Aidan Michael Williams, Chifley (AU)

(73) Assignee: Motorola, Inc., Schaumburg, IL (US)

( * ) Notice: Subject to any disclaimer, the term of this patent is extended or adjusted under 35 U.S.C. 154(b) by 754 days.

(21) Appl. No.: 10/053,476

(22) Filed: Nov. 7, 2001

(65) Prior Publication Data

US 2003/0088673 A1 May 8, 2003

(51) Int. Cl.[7] .............................................. G06F 15/173
(52) U.S. Cl. ....................... 709/226; 709/220; 709/249
(58) Field of Search ................................. 709/226, 220, 709/227, 249, 245, 238–239, 242; 370/401

(56) References Cited

U.S. PATENT DOCUMENTS

| 5,983,281 | A | * | 11/1999 | Ogle et al. ................... 709/249 |
| 6,009,103 | A | * | 12/1999 | Woundy ....................... 370/401 |
| 6,085,245 | A | | 7/2000 | Kaycee et al. |
| 6,115,545 | A | | 9/2000 | Mellquist |
| 6,147,976 | A | * | 11/2000 | Shand et al. ................. 370/254 |
| 6,185,623 | B1 | * | 2/2001 | Bailey et al. ................ 709/238 |
| 6,262,988 | B1 | * | 7/2001 | Vig .............................. 370/401 |
| 6,515,974 | B1 | * | 2/2003 | Inoue et al. ................. 370/331 |
| 6,691,165 | B1 | * | 2/2004 | Bruck et al. ................. 709/227 |
| 6,697,360 | B1 | * | 2/2004 | Gai et al. ..................... 370/389 |
| 6,732,189 | B1 | * | 5/2004 | Novaes ........................ 709/249 |
| 6,845,091 | B2 | * | 1/2005 | Ogier et al. ................. 370/338 |
| 2002/0194317 | A1 | * | 12/2002 | Kanada et al. .............. 709/223 |

OTHER PUBLICATIONS

Stuart Cheshire and Bernard Aboba; "Dynamic Configuration of Ipv4 link–local addresses"; ietf.org/internet–drafts/draft–ietf–zeroconf–ipv4–linklocal–04.txt; Jul. 19, 2001, pp. 1–20.
S. Thomson and T. Narten; "IPv6 Stateless Address Auto-configuration"; ietf.org/rfc/rfc2462.txt; Dec. 1998; pp. 1–24.
Bernard; "The Mini–DHCP Server"; draft–aboba–dhc–mini–04.txt; pp. 1–18, [no date].
R. Droms; "Dynamic Host Configuration Protocol (RFC 2131)"; ietf.org/rfc/rfc2131.txt.; pp. 1–26.
B. Haberma, and J. Marti; "Automatic Prefix Delegation Protocol for Internet Protocol Version 6 (lpv6)"; ietf.org/internet–drafts/draft–haberman–ipngwg–auto–prefix–01.txt; Jul. 2001; pp. 1–11.

* cited by examiner

*Primary Examiner*—Bharat Barot
*Assistant Examiner*—Philip B. Tran

(57) ABSTRACT

A network (100) of machines and method (200) for allocating a unique subnet identifier to a subnet in the network (100) having multiple subnets (155,160,165,170,175,190) and a plurality of associated routers (110, 130, 140, 150, 105). The unique subnet identifier provides part of an address of the subnet that is coupled to a router interface and is allocated by firstly determining that a subnet identifier for one of said subnets (155,160,165,170,175,190) is required. A step of allocating automatically a unique subnet identifier to the router interface is then effected, wherein the unique subnet identifier is determined to be unique by said network. A configuring step then configures the subnet to be addressed by said network 100 by using an address based at least partially on said unique subnet identifier.

16 Claims, 4 Drawing Sheets

METHOD AND SYSTEM OF AUTOMATIC ALLOCATION OF UNIQUE SUBNET IDENTIFIER TO A SUBNET IN THE NETWORK HAVING MULTIPLE SUBNETS AND A PLURALITY OF ASSOCIATED ROUTERS AND ROUTER INTERFACES

FIELD OF THE INVENTION

This invention relates to allocating subnet identifiers in a network of machines. The invention is particularly useful for, but not necessarily limited to, allocating subnet identifiers in an ad-hoc network having multiple subnets.

BACKGROUND ART

Address allocation of subnets operatively coupled by routers in a network typically use Internet Protocol (IP) as a preferred choice for facilitating communication and routing of data packets. However, it is not always easy to provide valid IP address allocations for ad-hoc networks and networks whose configuration is prone to modifications.

In U.S. Patent issued under number U.S. Pat. No. 6,115,545 there is described a method for allocating IP address allocation and assignment. Assignment is accomplished by a claim and collide address test in which a test result is typically provided by a Bootstrap or Dynamic Host Configuration Protocol (DHCP) response.

In U.S. Patent issued under number U.S. Pat. No. 6,085,245 there is described a system and method for implicitly supporting contiguous and discontiguous IP sub-networks. The system and method use a management station that maintains a database that operates in cooperation with a series of forwarding policies to create dynamic routing tables for supporting and defining the IP subnetworks.

There are also many standards documents that define mechanisms for IP address allocations for hosts and single links. However, although the prior art subnet identifier allocation and routing systems and methods are useful, it would be beneficial if subnets in a network are identified by a unique subnet identifier that is determined to be unique by, and allocated automatically by, the network without requiring a central server.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for allocating a subnet identifier to a subnet in a network of machines with multiple subnets and a plurality of associated routers, said subnet identifier providing at least part of an address of the subnet coupled to a router interface that interfaces one of said routers to said subnet, the method including the steps of:
  determining that a subnet identifier for one of said subnets is required;
  allocating automatically a unique subnet identifier to said router interface, wherein said unique subnet identifier is determined to be unique by said network; and
  configuring said subnet to be addressed by said network of machines by using an address based at least partially on said unique subnet identifier.

Suitably, the method may be further characterized by determining and allocating a unique subnet identifier for every operative router interface in the network. Preferably, at least one router may have more than one router interface, wherein each router interface is allocated a unique subnet identifier. Each router may suitably configure said subnet based on the router interface coupled to the subnet.

The method may be suitably further characterized by there being possibly more than one unique subnet interface identifier assigned to a subnet. The subnet may be a link with machines coupled thereto. Alternatively, the subnet can be a network comprising links, routers and machines coupled to said links.

Preferably, the step of allocating may be characterized by the steps of:
  obtaining said identifier;
  sending a claim request for said identifier from a claim requesting router, that is one of said routers, to at least one other router in said network; and
  validating said identifier as unique to said network if said requesting router does not receive an invalidation message within a predefined time period, said invalidation message being indicative of said identifier being allocated to one of said routers.

Preferably, the step of sending may be repeated at least once within said predefined time period.

Suitably, the step of sending may be characterized by at least one of said routers receiving said claim request and thereafter propagating said claim request to at least one other of said routers.

Suitably, said validating step may be further characterized by one of said routers, operating as a receiving router, providing said invalidation message if upon receipt of said claim request the receiving router has a prior claim to said identifier.

Preferably, each said router interface may have multiple unique subnet identifiers for different protocols.

According to another aspect of the invention there is provided a network of machines with multiple subnets and a plurality of associated routers, wherein the network allocates a subnet identifier to a router interface by the following steps:
  determining that a subnet identifier for the subnet coupled to the router interface is required;
  allocating automatically a unique subnet identifier to said router interface, wherein said unique subnet identifier is determined to be unique by said network; and
  configuring said subnet to be addressed by said network of machines by using an address based at least partially on said unique subnet identifier.

The network may in use effect any or all of the above method steps. Suitably, he network may have any or all of the above method characteristics.

BRIEF DESCRIPTION OF THE DRAWINGS

In order that the invention may be readily understood and put into practical affect, reference will now be made to preferred embodiments as illustrated with reference to the accompanying drawings in which.

DETAILED DESCRIPTION OF THE PREFERRED EMBODIMENTS OF THE INVENTION

Figure 1:
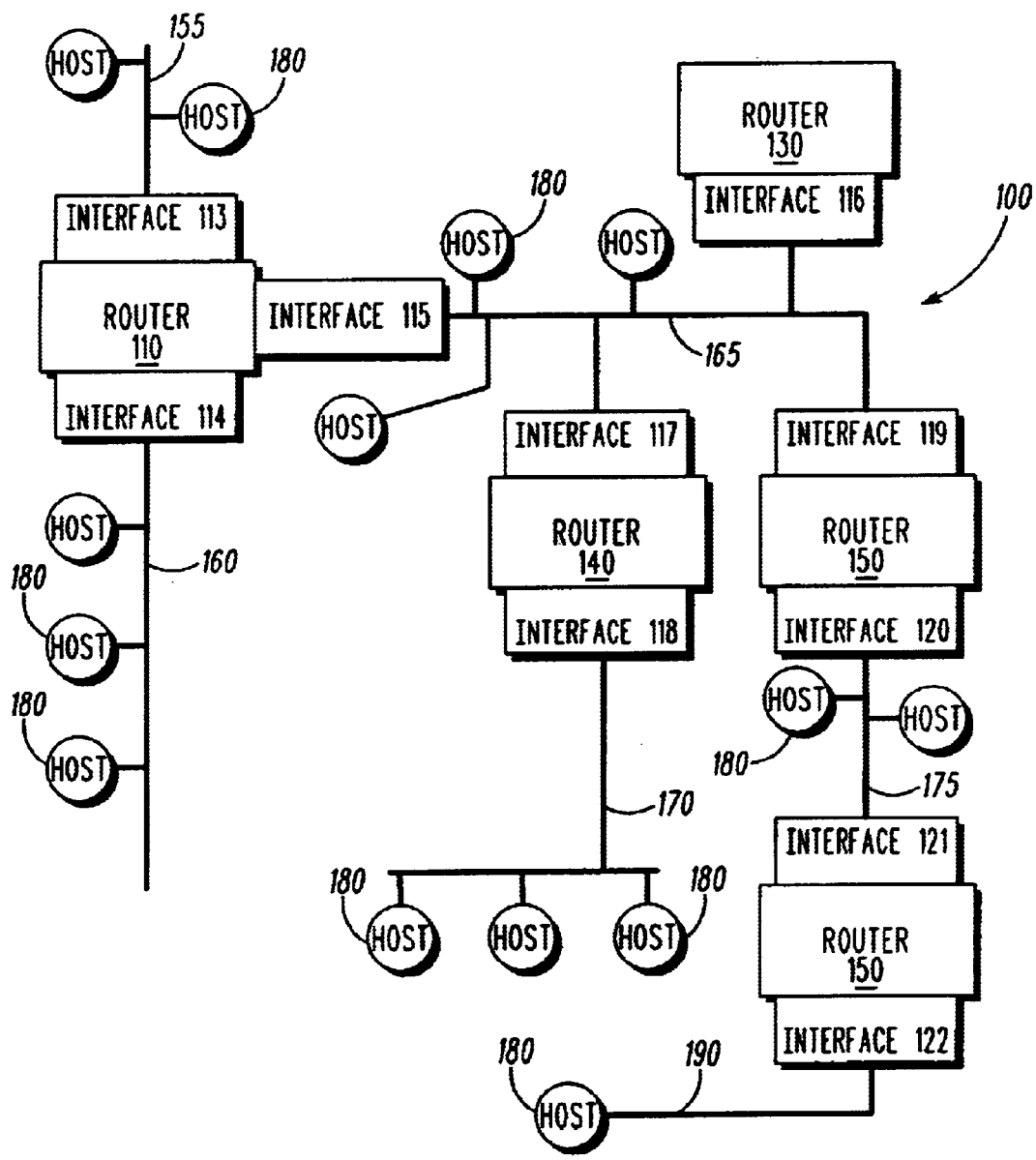
FIG. 1 illustrates a schematic block diagram for one example of a network of machines in accordance with the invention.

In the drawings, like numerals on different Figs are used to indicate like elements throughout. With reference to FIG. 1 there is illustrated an example of a multi-link ad-hoc network 100 of machines. The network 100 has a plurality of routers 105,110,130,140,150 and multiple subnets in the form of links 155,160,165,170,175,190 with associated computers or host machines 180. Router 110 has three interfaces 113,114,115 that respectively couple links 155, 160,165 to router 110. Router 130 has an interface 116 that couples link 165 to router 130. Further, router 140 has two interfaces 117,118 that respectively couple links 165,170 to router 140. Similarly, router 150 has two interfaces 119,120 that respectively couple links 165,175 to router 150. Finally, router 105 has two interfaces 121,122 that respectively couple links 175,190 to router 105. As will be apparent to a person skilled in the art, the links 155,160,165,170,175,190 can be any network linking medium such as Ethernet cables, radio links or otherwise. It should be noted that the number of host machines 180 and routers 105,110,130,140,150 in the ad-hoc network 100 may vary and may be typically unknown to any or all of the host machines 180 and routers 105,110,130,140,150.

Figure 2:
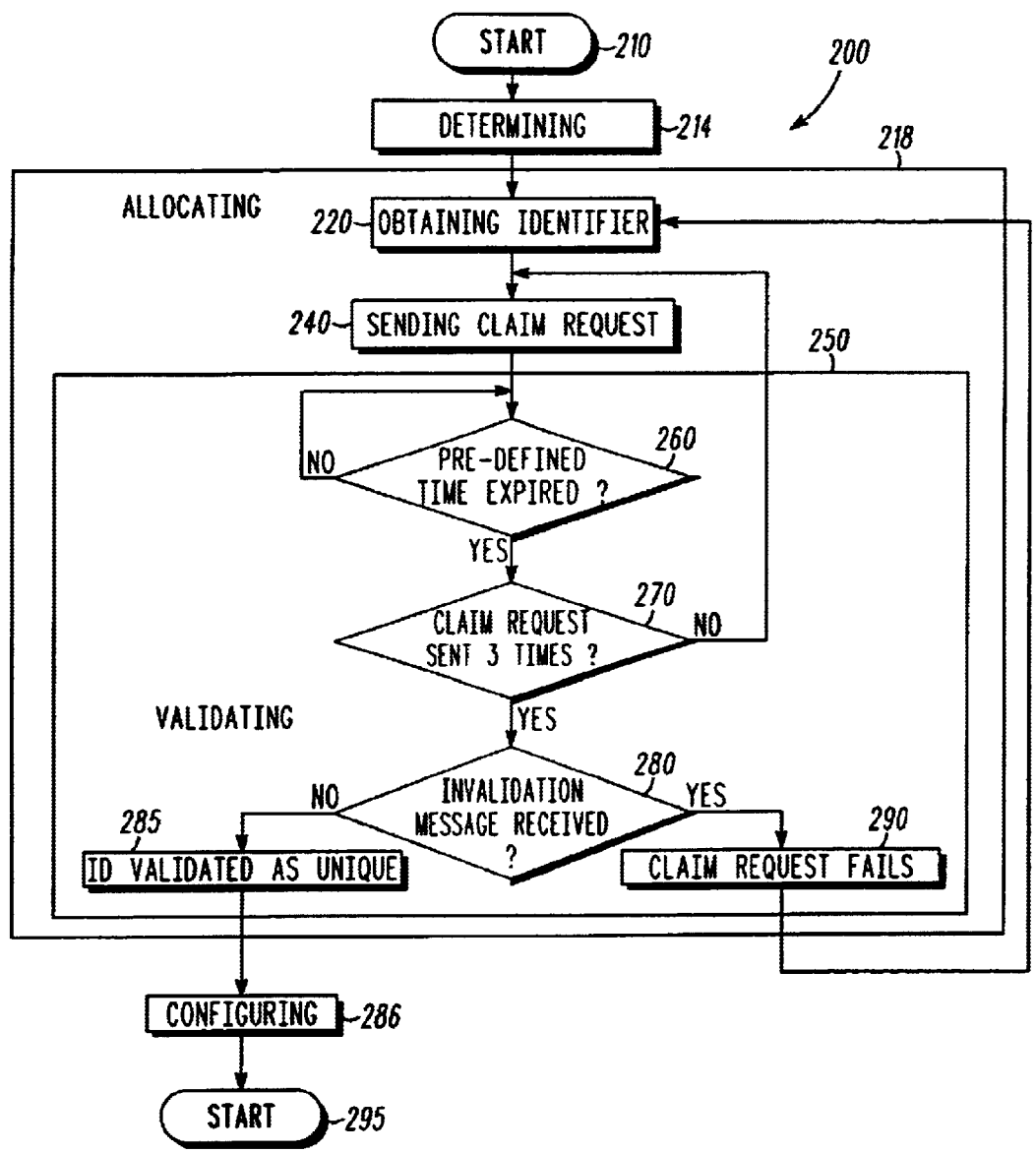
FIG. 2 is a first embodiment of a flow diagram illustrating a method for allocating a subnet identifier to a subnet in the network of machines of FIG. 1.

Referring to FIG. 2 there is illustrated a method 200 for allocating a subnet identifier within the multi-link ad-hoc network 100 of machines. The method 200 is invoked at a start step 210 when, for instance, link 155 is first operatively coupled to router 110 and thereafter router 110 determines at a determining step 214 that a subnet identifier for one of the links (in this case link 155) is required. The network 100 at an allocating step 218 allocates automatically a unique subnet identifier USI to the router interface 113 of router 110, wherein the unique subnet identifier USI is determined to be unique by the network 100. This is achieved by the following steps that include an obtaining identifier step 220 in which router 110 obtains an identifier ID, for example by use of a pseudo-random number generator, and sets a "sent claim request counter" to zero. Thereafter, at a sending claim request step 240 the router 110 sends a claim request for the identifier ID to the network 100 of machines.

The claim request is sent using hop-by-hop flooding in which the claim request is first sent to routers 130, 140 and 150 in a claim request message along the common link 165. In the example network 100 illustrated, routers 130, 140 and 150 operate as receiving machines for a claim request sent from router 110. The routers 130, 140 and 150 store the network address of router 110 which can be obtained from the source address in the protocol network as will be apparent to a person skilled in the art. The claim request is provided in the claim requesting message that preferably comprises: the identifier ID; a field for information identifying the application is for a router interface; a machine identifier field; and a sequence number field. The machine identifier field identifies which router originally sent the claim request message. The sequence number field is used for flood tracking in order to avoid infinite loops.

When the claim message is received by routers 130, 140 and 150, they determine if they have a prior claim to the identifier ID. In other words each of the routers 130, 140 and 150 checks if they have been allocated a number to one of their interfaces that is exactly the same as the number assigned to the identifier ID. If there is a prior claim to the identifier ID, then the router with the prior claim sends an invalidation message, routed by use of the network address, to router 110.

After receiving the claim request message routers 130, 140 and 150 propagate the claim message, if necessary, to other routers by hop-by-hop flooding. In the example network 100, router 150 propagates the claim request by a claim request message along the link 175 to router 105 that determines if it has a prior claim to the identifier ID. If there is a prior claim to the identifier ID then router 105 responds by sending an invalidation message, routed by use of the network address through router 150, to router 110.

After the sending claim request step 240, the "sent claim request counter" is incremented and the router 110 performs a validating step 250 in which router 110 waits for a pre-defined time at a test step 260. A claim request sending test 270 is then effected to determine if the "sent claim request counter" indicates that the claim request has been sent three times. If the claim request has not been sent three times by router 110 to the network 100, then the method 200 returns to the sending claim request step 240 and the sent claim request counter is incremented.

When the claim request has been sent three times, an invalidation message received test step 280 is effected to determine if router 110 has received a claim rejection for the claim request. A claim rejection is an invalidation message from one of the routers 105,130,140,150 in the network 100 that is indicative of the identifier ID not being unique because it is already allocated to a router interface. If no invalidation message was received by router 110 then the identifier ID is determined as a unique subnet identifier USI and validated as unique at an ID validation step 285 and the interface 113 assigns this unique subnet identifier USI to the subnet 155. After the ID validation step 285 a configuring step 286 is effected in which subnet to be addressed by the network 100 is configured to be addressed by using an address based at least partially on the unique subnet identifier USI. The method 200 then ends at step 295.

If at the invalidation message received test step 280 it is determined that the router 110 has received an invalidation message, then the claim request fails at step 290 is effected and router 110 then requires to select another identifier ID for interface 113. Accordingly, the method returns to the sending claim request step 240.

Figure 3:
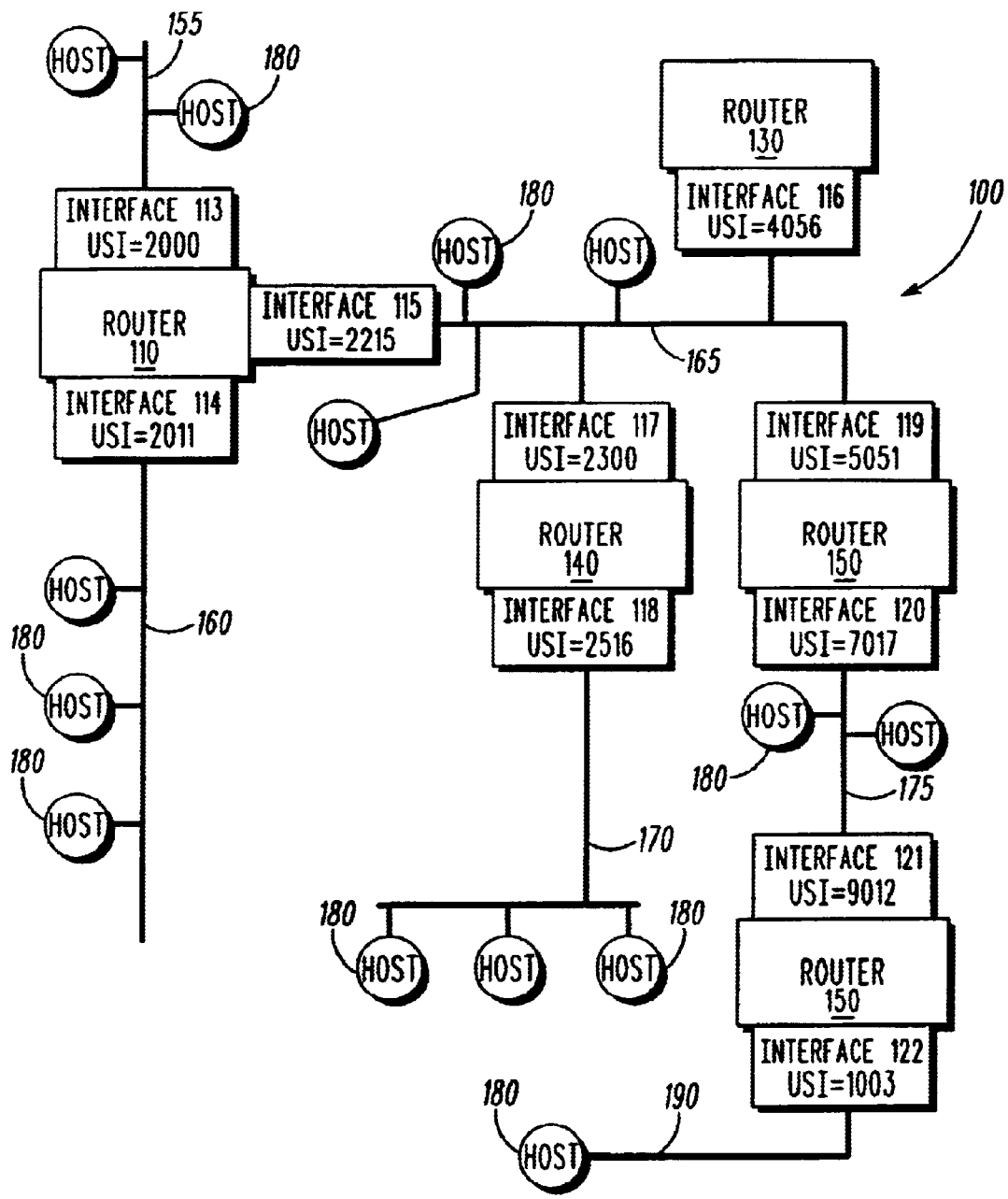
FIG. 3 illustrates allocated unique subnet identifiers for each router interface in the network of machines of FIG. 1.

Upon initial setup of the network 100, the method 200 is repeated for every subnet and associated router interface. Accordingly, as illustrated in FIG. 3, the method 200 allocates automatically a unique subnet identifier USI for each router interface. As illustrated, subnet 155 is allocated a prefix of a network address based on the unique subnet identifier USI of 2000. Similarly, subnets 160, 170 and 190 have respective unique subnet identifiers USIs 2011, 2516 and 1003. Further, subnet 175 is allocated automatically two unique subnet identifiers USIs of 7017 and 9012, whereas subnet 165 is allocated four unique subnet identifiers USIs of 2215, 2300, 4065 and 5051.

Figure 4:
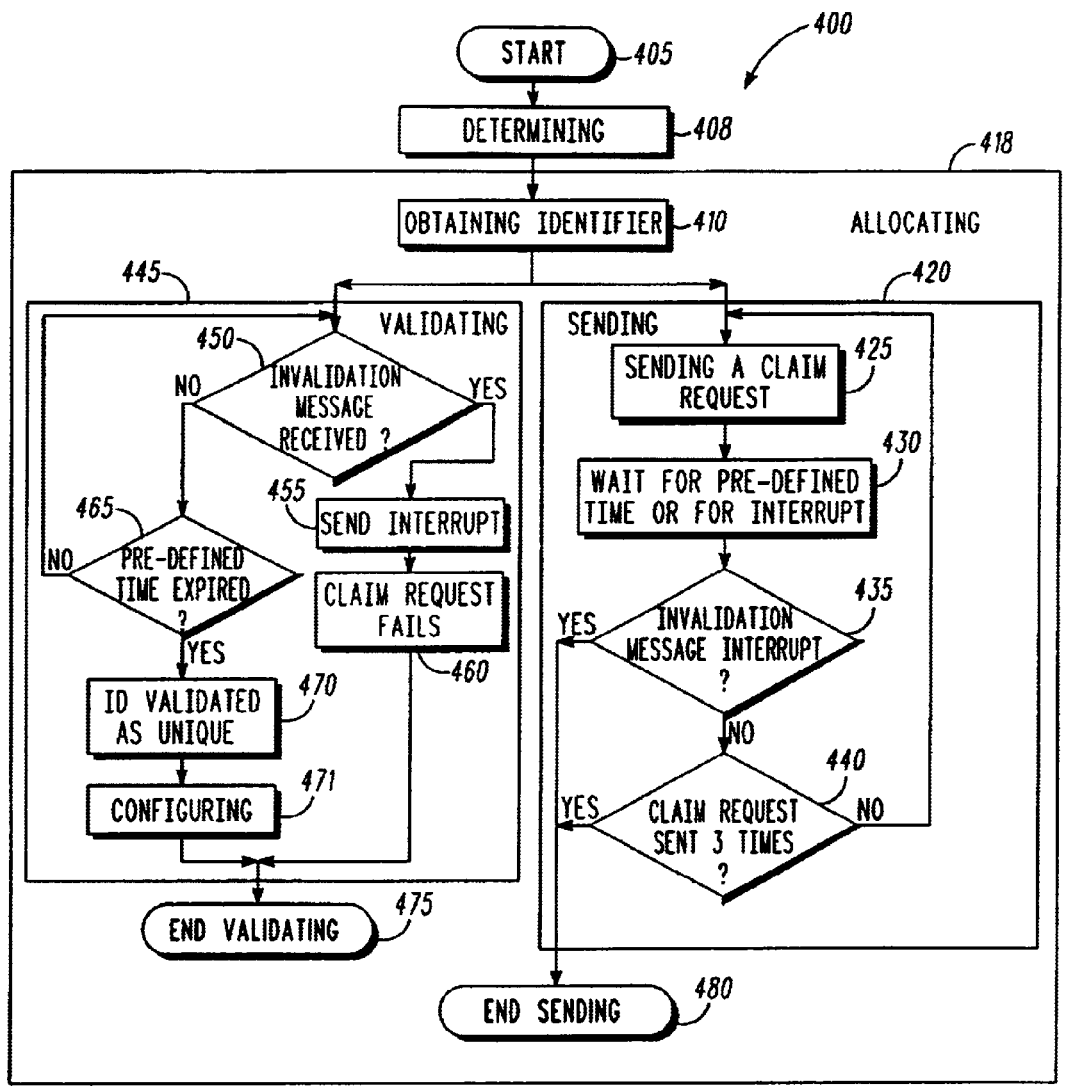
FIG. 4 is a second embodiment of a flow diagram illustrating a method for allocating a subnet identifier to a subnet in the network of machines of FIG. 1.

Referring to FIG. 4 there is illustrated a second embodiment of a method 400 for allocating a router interface subnet identifier within the multi-link ad-hoc network 100 of machines. A start step 405 and determining step 408 are identical to steps 210 and 214 of the method 200 and therefore to avoid repetition are not described again. After the determining step 408 an allocating step 418 is effected and allocates automatically the unique subnet identifier USI to the router interface 113 of router 110. The allocating step 418 firstly effects an obtaining identifier step 410 that is identical to step 220 of the method 200. After obtaining identifier step 419 two concurrent processes are effected. These concurrent processes are a sending step 420 and a validating step 445. The sending step 420 firstly effects a sending a claim request step 425 that is identical to step 240 of the method 200. After the sending a claim request step 425 the method 400 waits at a waiting step 430 for a pre-defined time or for receipt of an interrupt from the concurrently running validating step 445. After completion of the waiting step 430, an invalidation interrupt test step 435 is effected to check if an invalidation interrupt was received at the waiting step 430. If an invalidation interrupt was received then the sending step 420 terminates at an end sending step 480. Alternatively, if no invalidation interrupt was received then a check is conducted at a test step 440 to determine if the claim request was sent three times by checking the "sent claim request counter". In this regard steps 425, 430, 435 and 440 are effected three times, unless an invalidation interrupt is received. The sending step 420 then terminates at the end sending step 480.

The validating step 445 firstly determines if an invalidation message is received at a invalidation message received test step 450 that is identical to the invalidation message received test step 280 of the method 200. If no invalidation message was received at step 450 then a timer test step 465 is processed to determine if a pre-defined time has expired. If the pre-defined time has not expired then test step 450 is repeated and until either an invalidation message is received by router 110 or the pre-defined time expires. If no invalidation message is received and the pre-defined time expires the identifier ID is determined as a unique subnet identifier USI and is validated as unique at an ID validation step 470, unique subnet identifier USI to the subnet 155. After the ID validation step 470 is effected a configuring step 471 is effected in which the subnet to be addressed by the network 100 is configured by using an address based at least partially on the unique subnet identifier USI. The validating step 445 ends at an end validating step 475.

If an invalidation message is received test step 450 then a send interrupt step 455 is effected thereby sending an interrupt to the concurrently running process that is effecting the sending step 420. A claim request fails step 460 is then processed, which is the same as the claim request fails step 290 of method 200, and the validating step 445 ends at the end validating step 475. Accordingly, the router 110 is informed that the identifier ID is not a unique subnet identifier USI. The router therefore again attempts to obtain a unique subnet identifier USI by repeating the method 400.

The method 200 is repeated for every subnet and associated router interface requiring a unique subnet identifier USI. Accordingly, as illustrated in FIG. 3, the method 200 allocates automatically a unique subnet identifier USI to each router interface.

As will be apparent to a person skilled in the art, each router may have more than one router interface, and each router interface is allocated a unique subnet identifier. Further, each router configures a subnet based on the router interface coupled to a subnet or link. Accordingly, in the network 100 there are more than one unique subnet interface identifiers assigned to, for example, link 165. Advantageously, if for instance router 130 is removed from the network 100 then link 165 can still be addressed by used of the unique subnet identifiers USIs of interfaces 115, 117 and 199. Also it is possible for each router interface to have multiple unique subnet identifiers USIs for different protocols.

The present invention also allows a collection of routers to generate valid and unique subnet prefixes for every link in an arbitrary multi-link network without relying on a central server or manual pre-configuration. Accordingly, hosts and routers may be configured using the unique subnet prefixes.

The detailed description provides preferred exemplary embodiments only, and is not intended to limit the scope, applicability, or configuration of the invention. Rather, the detailed description of the preferred exemplary embodiments provide those skilled in the art with an enabling description for implementing preferred exemplary embodiments of the invention. It should be understood that various changes may be made in the function and arrangement of elements without departing from the spirit and scope of the invention as set forth in the appended claims.

We claim:

1. A method for allocating a subnet identifier to a subnet in a network of machines with multiple subnets and a plurality of associated routers, said subnet identifier providing at least part of an address of the subnet coupled to a router interface that interfaces one of said routers to said subnet, the method including the steps of:

determining that a subnet identifier for one of said subnets is required;

allocating automatically a unique subnet identifier to said router interface, wherein said unique subnet identifier is determined to be unique by said network; and configuring said subnet to be addressed by said network of machines by using an address based at least partially on said unique subnet identifier.

2. A method for allocating a subnet identifier as claimed in claim 1, further characterized by determining and allocating a unique subnet identifier for every operative router interface in the network.

3. A method for allocating a subnet identifier as claimed in claim 1, wherein at least one router has more than one router interface, and wherein each router interface is allocated a unique subnet identifier.

4. A method for allocating a subnet identifier as claimed in claim 1, wherein each router configures said subnet based on the router interface coupled to the subnet.

5. A method for allocating a subnet identifier as claimed in claim 1, further characterized by there being more than one unique subnet interface identifier assigned to a subnet.

6. A method for allocating a subnet identifier as claimed in claim 1, wherein the subnet is a link with machines coupled thereto.

7. A method for allocating a subnet identifier as claimed in claim 1, wherein the step of allocating is characterized by the steps of:

obtaining said identifier;

sending a claim request for said identifier from a claim requesting router, that is one of said routers, to at least one other router in said network; and validating said identifier as unique to said network if said requesting router does not receive an invalidation message within a predefined time period, said invalidation message being indicative of said identifier being allocated to one of said routers.

8. A method for allocating a subnet identifier as claimed in claim 7, wherein the step of sending is repeated at least once within said predefined time period.

9. A method for allocating a subnet identifier as claimed in claim 7, wherein the step of sending is characterized by at least one of said routers receiving said claim request and thereafter propagating said claim request to at least one other of said routers.

10. A method for allocating a subnet identifier as claimed in claim 7 wherein said validating step is further characterized by one of said routers, operating as a receiving router, providing said invalidation message if upon receipt of said claim request the receiving router has a prior claim to said identifier.

11. A method for allocating a subnet identifier as claimed in claim 1, wherein each said router interface has multiple unique subnet identifiers for different protocols.

12. A network of machines with multiple subnets and a plurality of associated routers, wherein the network allocates a subnet identifier to a router interface by the following steps:

determining that a subnet identifier for the subnet coupled to the router interface is required;

allocating automatically a unique subnet identifier to said router interface, wherein said unique subnet identifier is determined to be unique by said network; and configuring said subnet to be addressed by said network of machines by using an address based at least partially on said unique subnet identifier.

13. A network of machines as claimed in claim 12, wherein the network is further characterized by determining and allocating a unique subnet identifier for every operative router interface in the network.

14. A network of machines as claimed in claim 12 wherein at least one router has more than one router interface, and wherein each router interface is allocated a unique subnet identifier.

15. A network of machines as claimed in claim 12, wherein each router configures said subnet based on the router interface coupled to the subnet.

16. A network of machines as claimed in claim 12, further characterized by there being more than one unique subnet interface identifier assigned to a subnet.

* * * * *